(12) United States Patent
Urushibara et al.

(10) Patent No.: US 10,705,291 B2
(45) Date of Patent: Jul. 7, 2020

(54) OPTICAL TRANSMISSION SYSTEM

(71) Applicant: NIPPON TELEGRAPH AND TELEPHONE CORPORATION, Tokyo (JP)

(72) Inventors: Azusa Urushibara, Tsukuba (JP); Takayoshi Mori, Tsukuba (JP); Taiji Sakamoto, Tsukuba (JP); Masaki Wada, Tsukuba (JP); Takashi Yamamoto, Tsukuba (JP); Kazuhide Nakajima, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/327,946

(22) PCT Filed: Aug. 25, 2017

(86) PCT No.: PCT/JP2017/030502
§ 371 (c)(1),
(2) Date: Feb. 25, 2019

(87) PCT Pub. No.: WO2018/043320
PCT Pub. Date: Mar. 8, 2018

(65) Prior Publication Data
US 2019/0187365 A1 Jun. 20, 2019

(30) Foreign Application Priority Data
Aug. 29, 2016 (JP) ................................. 2016-167359

(51) Int. Cl.
*G02B 6/02* (2006.01)
*G02B 6/44* (2006.01)
(Continued)

(52) U.S. Cl.
CPC .......... *G02B 6/02057* (2013.01); *G02B 6/02* (2013.01); *G02B 6/02033* (2013.01); *G02B 6/14* (2013.01); *G02B 6/44* (2013.01); *H04B 10/2581* (2013.01)

(58) Field of Classification Search
CPC .................................................. G02B 6/02057
See application file for complete search history.

(56) References Cited

U.S. PATENT DOCUMENTS 4,804,248 A * 2/1989 Bhagavatula ...... H04B 10/2581
385/28
5,185,827 A * 2/1993 Poole .................. G02B 6/29377
385/28
(Continued)

FOREIGN PATENT DOCUMENTS

EP 2541809 A1 1/2013
EP 2742377 A1 6/2014
(Continued)

OTHER PUBLICATIONS

Arik et al., Effect of Mode Coupling on Signal Processing Complexity in Mode-Division Multiplexing, Journal of Lightwave Technology, V. 31, N. 3, 2013 (Year: 2013).*
(Continued)

*Primary Examiner* — Peter Radowski
(74) *Attorney, Agent, or Firm* — Harness, Dickey & Pierce, P.L.C.

(57) ABSTRACT

An optical transmission system according to the present disclosure is a mode multiplexed optical transmission system using a multi-mode optical fiber in which a plurality of propagation modes propagate as a transmission line, the optical transmission system including an optical fiber transmission line (83) that includes an optical fiber with two or more propagation modes; and a plurality of mode converters (91) that are configured to generate mode coupling between
(Continued)

at least one pair of the propagation modes, in which a variation in an installation interval of the plurality of mode converters (91) is equal to or less than a threshold value determined by the transmission line length (Lt) of the optical fiber transmission line (83).

9 Claims, 11 Drawing Sheets

(51) Int. Cl.
    *G02B 6/14*           (2006.01)
    *H04B 10/2581*     (2013.01)

(56) References Cited

U.S. PATENT DOCUMENTS

| | | | | |
|---|---|---|---|---|
| 5,185,828 | A | * | 2/1993 | van der Tol .......... G02B 6/126 385/11 |
| 5,411,566 | A | * | 5/1995 | Poole .................. C03B 37/15 385/28 |
| 5,703,977 | A | * | 12/1997 | Pedersen ............. G02B 6/126 385/28 |
| 5,708,740 | A | * | 1/1998 | Cullen ............... G02B 6/02071 385/39 |
| 5,942,956 | A | * | 8/1999 | Haq .................... H01P 1/16 333/21 R |
| 6,424,764 | B1 | * | 7/2002 | Webb .................. G02B 6/14 385/27 |
| 6,563,981 | B2 | * | 5/2003 | Weisberg ............ G02B 6/023 385/126 |
| 6,728,439 | B2 | * | 4/2004 | Weisberg ............ G02B 6/023 385/126 |
| 2007/0065081 | A1 | * | 3/2007 | Antona ............. G02B 6/02019 385/123 |
| 2014/0186040 | A1 | * | 7/2014 | Fujiwara ............ G02B 6/2808 398/66 |
| 2014/0248052 | A1 | * | 9/2014 | Li ..................... H04J 14/04 398/44 |

FOREIGN PATENT DOCUMENTS

| | | | |
|---|---|---|---|
| JP | 2007-086776 | A | 4/2007 |
| JP | 2013-214852 | A | 10/2013 |
| JP | 2013214852 | A * | 10/2013 |
| JP | 2015026742 | A | 2/2015 |
| JP | 2016-082318 | A | 5/2016 |
| WO | WO-2013023193 | A1 | 2/2013 |
| WO | WO-2013/046696 | A1 | 4/2013 |

OTHER PUBLICATIONS

Giles et al., Fiber LPG Mode Converters and Mode Selection Technique for Multimode SDM, in IEEE Photonics Technology Letters, vol. 24, No. 21, pp. 1922-1925, Nov. 1, 2012. doi: 10.1109/LPT.2012.2219044 (Year: 2012).*

Li et al., Mode multiplexing and de-multiplexing using few-mode tilted fiber Bragg grating for SDM-WDM transmission system, Communication Systems (ICCS) 2014 IEEE International Conference on, pp. 278-282, 2014. (Year: 2014).*

P. J. Winzer, et al., "Mode-dependent loss, gain, and noise in MIMO-SDM systems," in Proc. ECOC 2014, paper Mo. 3. 3. 2, 2014.

S. Ö. Arik, D. Askarov, J. M. Kahn, "Effect of Mode Coupling on Signal Processing Complexity in Mode-Division Multiplexing," J. Lightwave Technol.31(3) (2013) 423-431.

Lobato, A.; Ferreira, F.; Rabe, J.; Kuschnerov, M.; Spinnler, B.; Lankl, B., "Mode Scramblers and Reduced-Search Maximum-Likelihood Detection for Mode-Dependent-Loss-Impaired Transmission," in Optical Communication (ECOC2013), 39th European Conference and Exhibition, Th. 2. C. 3, Sep. 22-26, 2013.

N. Fontaine, R. Ryf, M. Hirano, and T. Sasaki, "Experimental Investigation of Crosstalk Accumulation in a Ring-Core Fiber," in Proc. IEEE Photon. Soc. Summer Top. Meeting Series, 2013, pp. 111-112.

Y. Wakayama, D. Soma, K. Igarashi, H.Taga, and T. Tsuritani, "Intermediate Mode Interchange for Reduction of Differential Mode-Group Delay in Weakly-Coupled 6-Mode Fiber Transmission Line," in Optical Fiber Communication Conference, OSA Technical Digest (online) (Optical Society of America, 2016), paper M3E. 6.

I. Giles, A. Obeysekara, R. Chen, D. Giles, F. Poletti, and D. Richardson "Fiber LPG Mode Converters and Mode Selection Technique for Multimode SDM," IEEE Photonics Technology Letters, 24(21), (2012), pp. 1922-1925.

N. Blake, B. Y. Kim, and H. J. Shaw, "Fiber-optic modal coupler using periodic microbending," Optics Letters, 11(3), (1986), pp. 177-179.

International Search Report for International Application No. PCT/JP2017/030502, dated Nov. 7, 2017, with English translation.

Ramachandran, Siddharth et al., "Static and tunable dispersion management with higher order mode fibers", Fiber Based Dispersion Compensation/ Siddharth Ramachandran, Springer-Verlag, USA, vol. 3, No. 3, pp. 187-248, XP009167193, ISBN: 978-0-387-48948-3, Jan. 1, 2007.

Extended European Search Report from counterpart EP178463253, dated Mar. 3, 2020.

* cited by examiner

FIG. 16

| | LPG PITCH NECESSARY FOR MODE COUPLING (μm) | | | | |
|---|---|---|---|---|---|
| | O BAND 1260~1360nm | E BAND 1360~1460nm | S BAND 1460~1530nm | C BAND 1530~1565nm | L BAND 1565~1625nm |
| BETWEEN LP01 AND LP11 | 1790~1900 | 1700~1790 | 1650~1700 | 1620~1650 | 1580~1620 |
| BETWEEN LP11 AND LP21 | 1380~1450 | 1310~1380 | 1270~1310 | 1250~1270 | 1230~1250 |

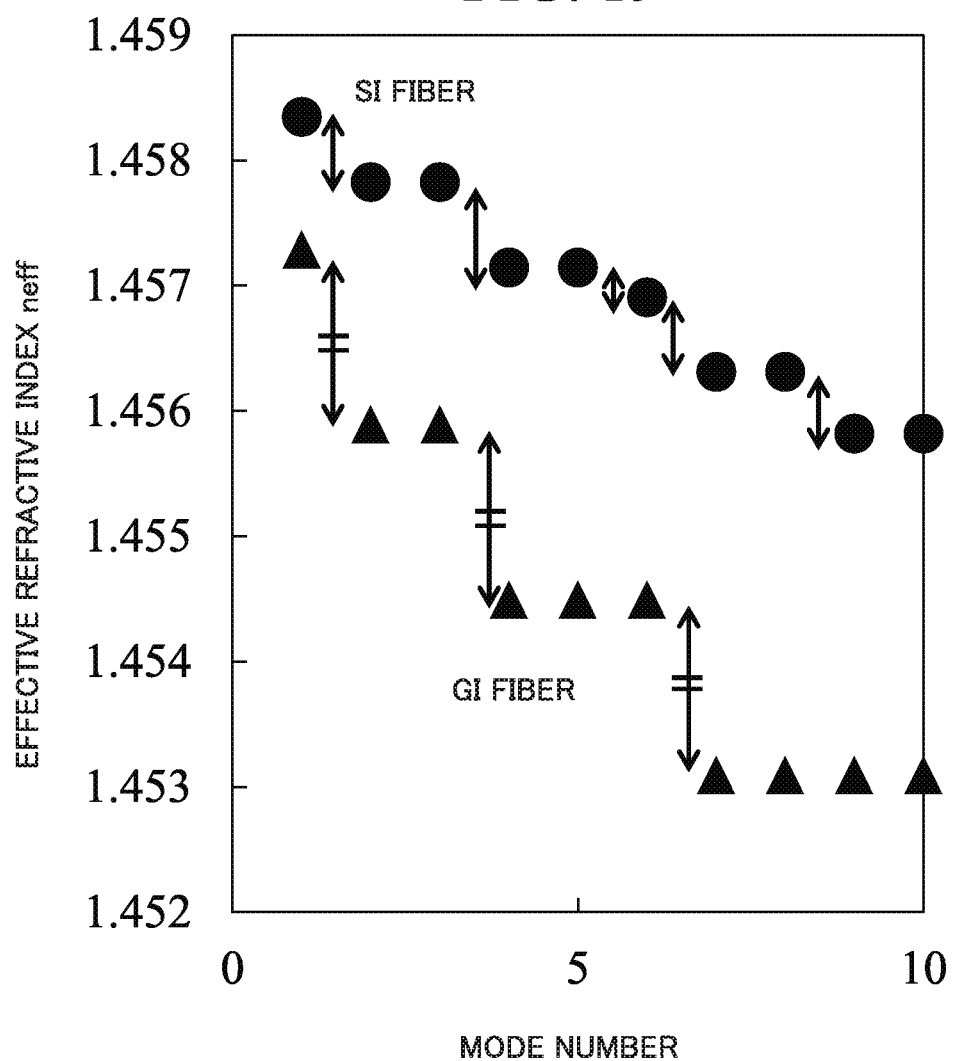

OPTICAL TRANSMISSION SYSTEM

CROSS-REFERENCE TO RELATED APPLICATIONS

This application is a 371 U.S. National Stage of International Application No. PCT/JP2017/030502, filed on 25 Aug. 2017, which claims priority on Japanese Patent Application No. 2016-167359, filed in Japan on Aug. 29, 2016. The contents of both of the above applications are incorporated herein by reference.

TECHNICAL FIELD

The present disclosure relates to an optical transmission system using a multi-mode fiber in which a plurality of propagation modes propagate.

BACKGROUND ART

A multi-mode optical fiber using a plurality of propagation modes has been proposed as a technique to increase the transmission capacity. In particular, mode multiplexed transmission using a plurality of propagation modes is attracting attention as a new large capacity transmission scheme because the transmission capacity can be improved by several times the number of modes.

In transmission using the multi-mode optical fiber, inter-mode crosstalk occurs in the transmission line, so a multiple input multiple output (MIMO) equalizer is used at the receiving end as compensation means.

However, in a case where there is a mode dependent loss (MDL), even if a MIMO equalizer is used, performance degradation of a transmission system becomes a problem (for example, see Non-Patent Document 1). Further, if group delay spread (GDS), which is the spread of pulses related to MIMO signal processing, is large at the receiving end, the load of digital signal processing (DSP) related to MIMO increases, so the DSP load needs to be reduced in order to realize long distance transmission (see, for example, Non-Patent Document 2).

Therefore, in order to alleviate the influence of MDL and DMD, use of a mode scrambler that are configured to generate coupling between modes has been proposed (see, for example, Non-Patent Document 3). A ring core type fiber has been proposed in order to positively generate coupling between modes in an optical fiber transmission line (see, for example, Non-Patent Document 4). Furthermore, a DMD reduction effect has been experimentally checked by generating mode coupling in 2 km of six-mode fiber using a mode multiplexer/demultiplexer (see, for example, Non-Patent Document 5).

CITATION LIST

Non-Patent Literature

[Non-Patent Document 1] P. J. Winzer, et al., "Mode-dependent loss, gain, and noise in MLMO-SDM systems," in Proc. ECOC 2014, paper Mo. 3.3.2, 2014.
[Non-Patent Document 2] S. O. Arik, D. Askarov, J. M. Kahn, "Effect of mode coupling on signal processing complexity in mode-divisionmultiplexing" J. Lightwave Technol. 31 (3) (2013) 423-431.
[Non-Patent Document 3] Lobato, A.; Ferreira, F.; Rabe, J.; Kuschnerov, M., Spinnler, B.; Lankl, B., "Mode scramblers and reduced-search maximum-likelihood detection for mode-dependent-loss-impaired transmission," in Optical Communication (ECOC2013), 39th European Conference and Exhibition, Th. 2. C. 3, 22-26 Sep. 2013.
[Non-Patent Document 4] N. Fontaine, R. Ryf, M. Hirano, and T. Sasaki, "Experimental investigation of crosstalk accumulation in a ring-core fiber," in Proc. IEEE Photon. Soc. Summer Top. Meeting Series, 2013, pp. 111-112.
[Non-Patent Document 5] Y. Wakayama, D. Soma, K. Igarashi, H. Taga., and T. Tsuritani, "Intermidiate Mode Interchange for Reduction of Differential Mode-Group Delay in Weakly-Coupled 6-Mode Fiber Transmission Line, "in Optical Fiber Communication Conference, OSA. Technical Digest (online) (Optical Society of America, 2016), Paper M3E. 6.
[Non-Patent Document 6] I. Giles, A. Obeysekara, R. Chen, D. Giles, F. Poletti, and D. Richardson, "Fiber LPG Mode Converters and Mode Selection Technique for Multimode SDM, "IEEE Photonics Technology Letters, 24(21), (2012), pp. 1922-1925.
[Non-Patent Document 7] J. N. Blake, B. Y. Kim, and H. J. Shaw, "Fiber-optic modal coupler using periodic microbending, "Optics Letters, 11(3), (1986), pp. 177-179.

SUMMARY OF INVENTION

Technical Problem

However, in Non-Patent Document 4, it is easy to generate mode coupling with a slight disturbance by making the propagation constant difference $\Delta\beta$ between the propagation modes of the optical fiber as small as possible, but $\Delta\beta$ tends to increase in the higher-order mode, so it is difficult to generate sufficient mode coupling even in a case where the number of modes is increased. In Non-Patent Document 5, a mode converter is installed only in one place in the transmission line, and the mode coupling amount is determined by the input power, but the power between degenerate modes easily changes due to disturbance, so there is a problem that the mode coupling is insufficient, and the mode coupling amount tends to be small due to disturbance.

Therefore, an object of the present disclosure is to appropriately install a mode converter in an optical fiber transmission line, in a mode multiplexed optical transmission system using a multi-mode optical fiber in which a plurality of propagation modes propagate as a transmission line.

Solution to Problem

Specifically, an optical transmission system according to an aspect of the present invention includes an optical fiber transmission line that includes an optical fiber with two or more propagation modes; and a plurality of mode converters that generate mode coupling between at least one pair of the propagation modes, in which a variation in installation intervals of the plurality of mode converters is equal to or less than a threshold value determined by the transmission line length of the optical fiber transmission line.

The sum of the coupling amount of mode coupling of the plurality of mode converters may be larger than a threshold value determined by a group delay difference between the propagation modes of the optical fiber transmission line.

An optical fiber having a grating pitch corresponding to a propagation constant difference between the propagation modes in a longitudinal direction may be used for the mode converter.

Advantageous Effects of Invention

The present disclosure can provide an optical transmission system in which efficient mode coupling occurs, since a mode converter is appropriately installed in an optical fiber transmission line, in a mode multiplexed optical transmission system using a multi-mode optical fiber in which a plurality of propagation modes propagate as a transmission line.

BRIEF DESCRIPTION OF DRAWINGS

FIG. 16 is a table showing the wavelength dependence of the coupling pitch necessary for mode coupling between the LP01 and LP11 modes and between the LP11 and LP21 modes.

FIG. 19 is a diagram showing a comparison between SI fiber and GI fiber of effective refractive index in each mode.

DESCRIPTION OF EMBODIMENTS

Figure 1:
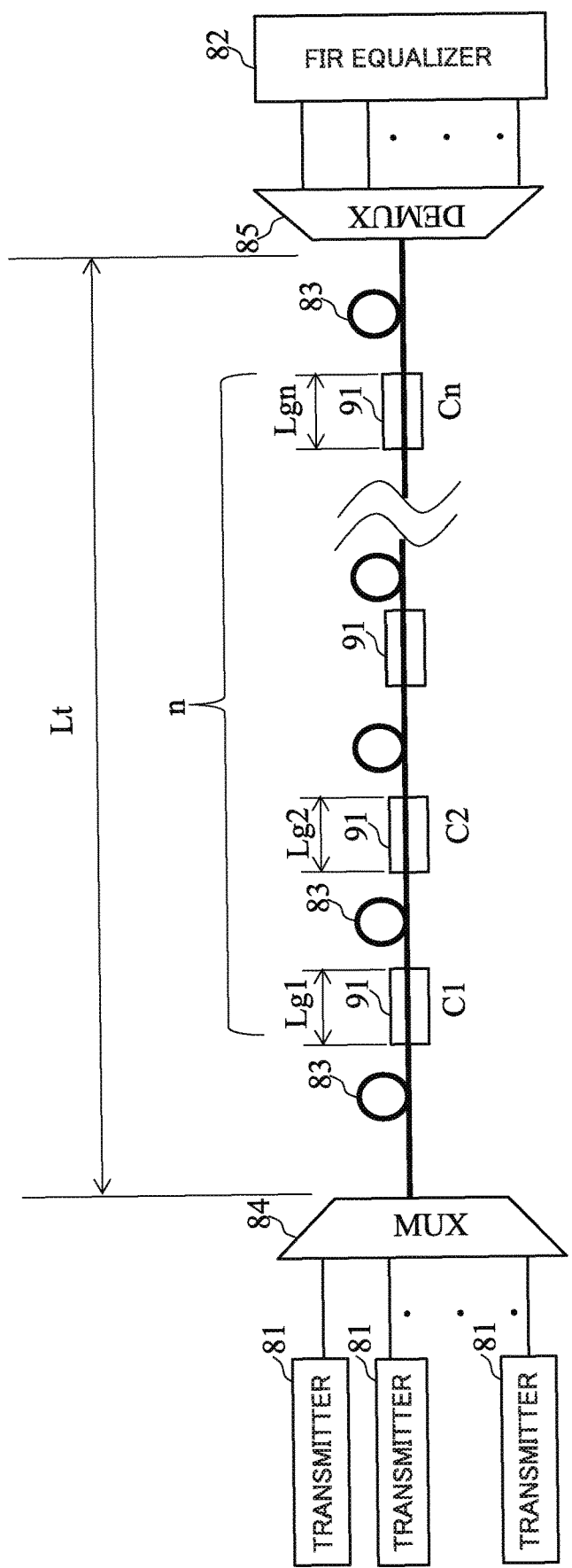
FIG. 1 is a diagram showing a first configuration example of a transmission system according to Embodiment 1.

Hereinafter, embodiments of the present disclosure will be described in detail with reference to the accompanying drawings. The present disclosure is not limited to the embodiments described below. The embodiments are only examples, and the present disclosure can be implemented in various modified and improved forms based on knowledge of those skilled in the art. The same reference numerals in the present specification and drawings denote the same constituent elements.

First Embodiment

Figure 2:
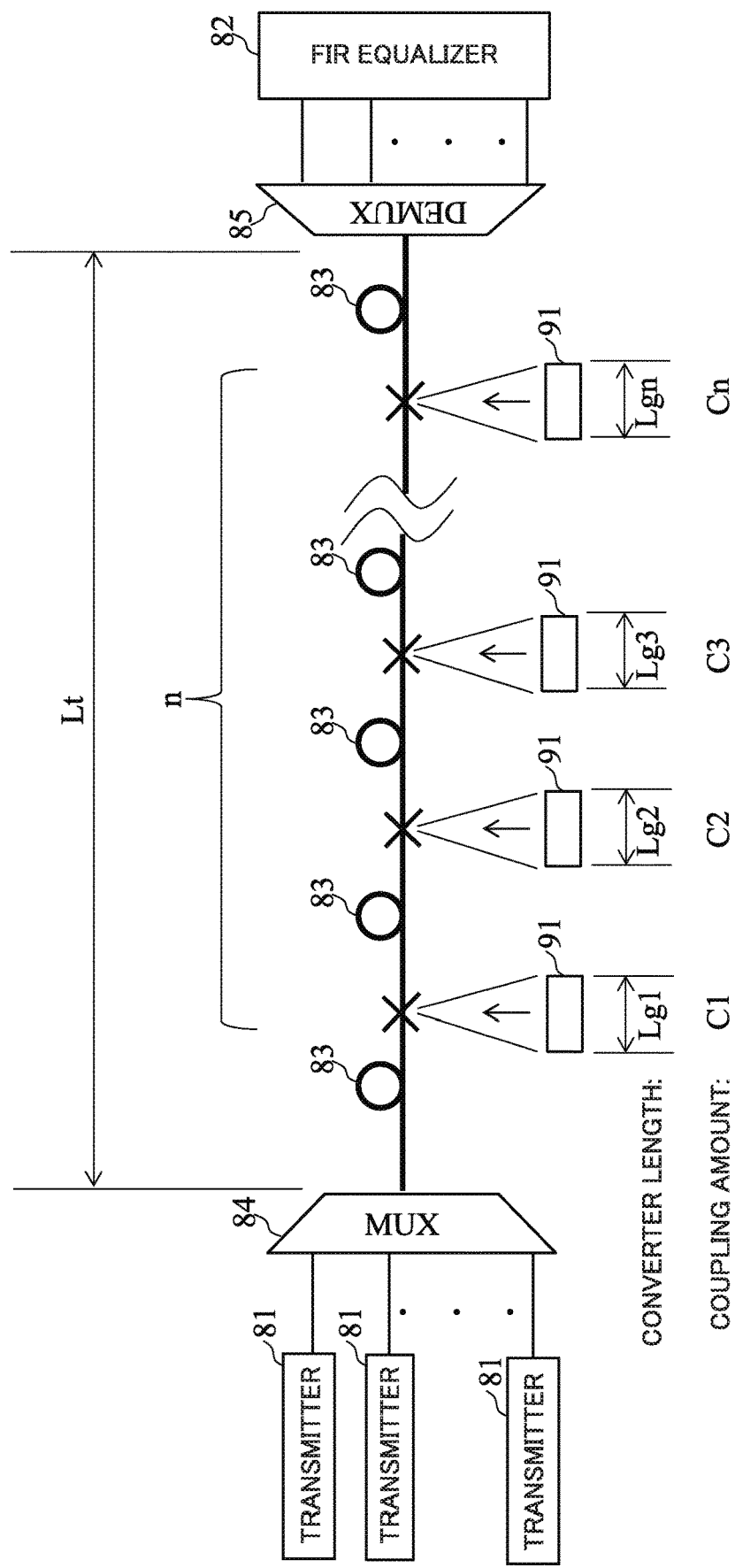
FIG. 2 is a diagram showing a second configuration example of the transmission system according to Embodiment 1.

FIG. 1 and FIG. 2 show examples of the configuration of an optical transmission system using a mode converter of the present embodiment. The optical transmission system according to the present embodiment is configured such that signals are transmitted from a plurality of transmitters 81, modes are multiplexed by a mode multiplexer (MUX) 84 and propagated to an optical fiber transmission line 83, the multiplexed mode is demultiplexed by a mode demultiplexer (DEMUX) 85, and signal restoration is performed by a finite impulse response (FIR) equalizer 82. The optical fiber transmission line 83 includes an optical fiber capable of transmitting a plurality of modes.

It is assumed that the transmission line length of the optical fiber ransmission line 83 is Lt, the number of installed mode converters 91 in the entire optical fiber transmission line 83 is n, the length of each mode converter 91 is Lgi, and the coupling amount in each mode converter 91 is Ci. However, the coupling amount is an index indicating the degree of coupling with 1 as the maximum value. The coupling amount is set 1 for the case where 100% power shifts to the other mode, and is set to 0.5 for the case where 50% power shifts.

In FIG. 1, a transmission line is assumed in which the mode converter 91 is installed on the optical fiber transmission line 83 and the optical fiber transmission line 83 serves as the mode converter 91, whereas a case is also conceivable in which the mode converter 91 is inserted in the optical fiber transmission line 83, as shown in FIG. 2. The transmission line length Lt includes the converter length Lg in FIG. 1, whereas the transmission line length Lt does not include the converter length Lg in FIG. 2. From this, the notation of the condition of the standard deviation of the installation interval is different between FIG. 1 and FIG. 2.

Figure 3:
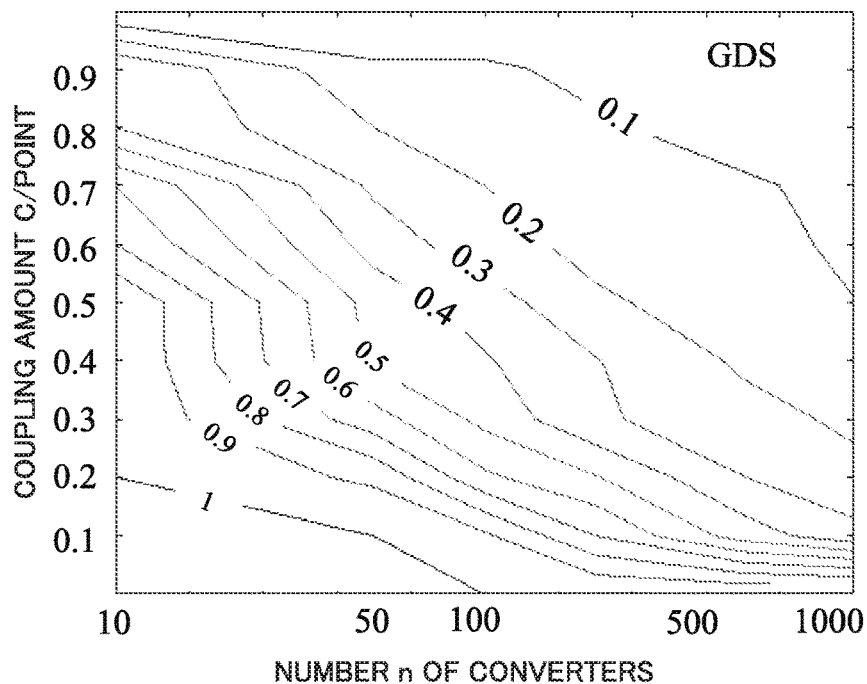
FIG. 3 is a diagram showing the number of converters in an optical fiber transmission line, the coupling amount per point, and a GDS reduction effect at that time.

In FIG. 3, the number n of converters using the mode converter 91 in the entire optical fiber transmission line 83 and the relative value of GDS in the coupling amount C are represented by contour lines. Here, it is assumed that the coupling amount C at each coupling point is all equal, and the installation interval is always constant. In FIG. 3, the transmission line length Lt and the converter length Lg are not taken into consideration and are set to arbitrary lengths. The relative value of GDS is a relative value with respect to the propagation time difference between the modes owned by the optical fiber itself. When the relative value is 1, the GDS is not reduced, and when it is 0.5, the relative value is halved. From FIG. 3, it is possible to reduce the relative value of GDS if the number of couplings and the coupling amount increase. For example, when the number n of converters is 100 and the coupling amount C is 0.3, the relative value of GDS can be suppressed to 0.5. That is, the DSP load can be reduced to 0.5 times.

However, even if the power changes by 100% in each mode converter 91, if a disturbance occurs in the optical fiber transmission line 83, a phase change and a power change between the degenerate modes occur, and the mode to be coupled is determined in each mode converter 91, so the GDS value can fluctuate. Therefore, how much the GDS relative value fluctuates due to disturbance with respect to the number n of converters in the optical fiber transmission line 83 is calculated.

It is assumed that all installation intervals are constant and the LP01, LP11a, and LP11b modes propagate. In the electric field distribution in the LP11 mode due to disturbance, the LP11a mode may shift to the LP11b mode, so the power ratios of the LP11a and LP11b modes are calculated to be randomly changed from the mode converter 91 to the next mode converter 91.

Figure 4:
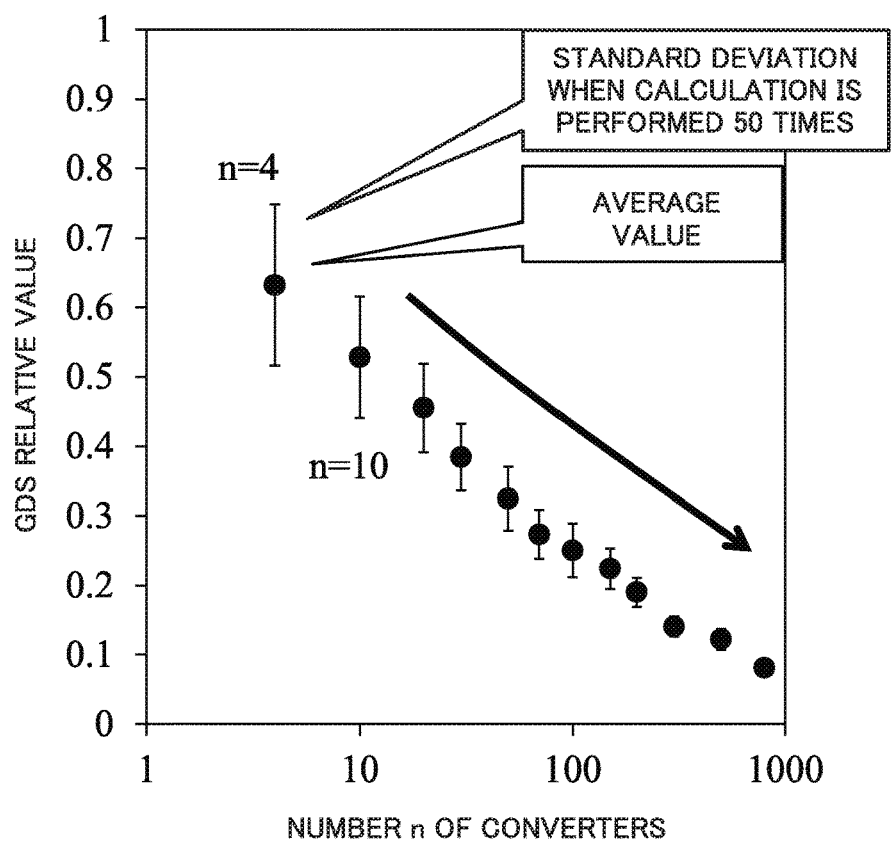
FIG. 4 is a diagram showing a relationship between the number of converters and fluctuation of the GDS reduction effect in consideration of power fluctuation between degenerate modes due to disturbance.

Since mode coupling occurs in LP01 mode and only one of LP11a mode and LP11b mode in the mode converter 91, the power ratio between the LP11a and LP11b modes changes, so the coupling amount also changes. A similar calculation is performed 50 times, and the calculation results of the average value and the standard deviation of the GDS relative value are shown in FIG. 4. It can be seen from the calculation result of FIG. 4 that both the fluctuation range and the average value of the relative value of GDS can be reduced by increasing the number n of converters. In addition, even if fluctuation of characteristics due to disturbance occurs, in order to suppress the GDS relative value to 0.5 or less, the number of converters is required to be 30 or more. Considering the influence of the disturbance as described above, the number n of converters is required to be 30. However, since as shown in FIG. 3, the GDS also depends on the coupling amount C at each coupling point, the GDS can be suppressed by half, if the sum of the coupling amount at each coupling point is 30 or more, with the number n of converters being 30 and the coupling amount being 1 as the minimum standard. That is, Expression (1) is necessary.

$$\Sigma_{i=1}^{n} C_1 > 30 \tag{1}$$

Next, the situation is considered where the installation intervals are not constant. Although it is preferable that the mode converters 91 are disposed at regular intervals, it is possible to obtain the effect of reducing the inter-mode propagation time difference even in a case where the installation interval is not an equal interval. Since the region in which the inter-mode propagation delay difference spreads is considered as a part where the mode converter 91 is not installed in the optical fiber transmission line 83, the total length is expressed by Expression (2).

$$L_t - \Sigma_{i=1}^{n} L_{gi} \tag{2}$$

Figure 5:
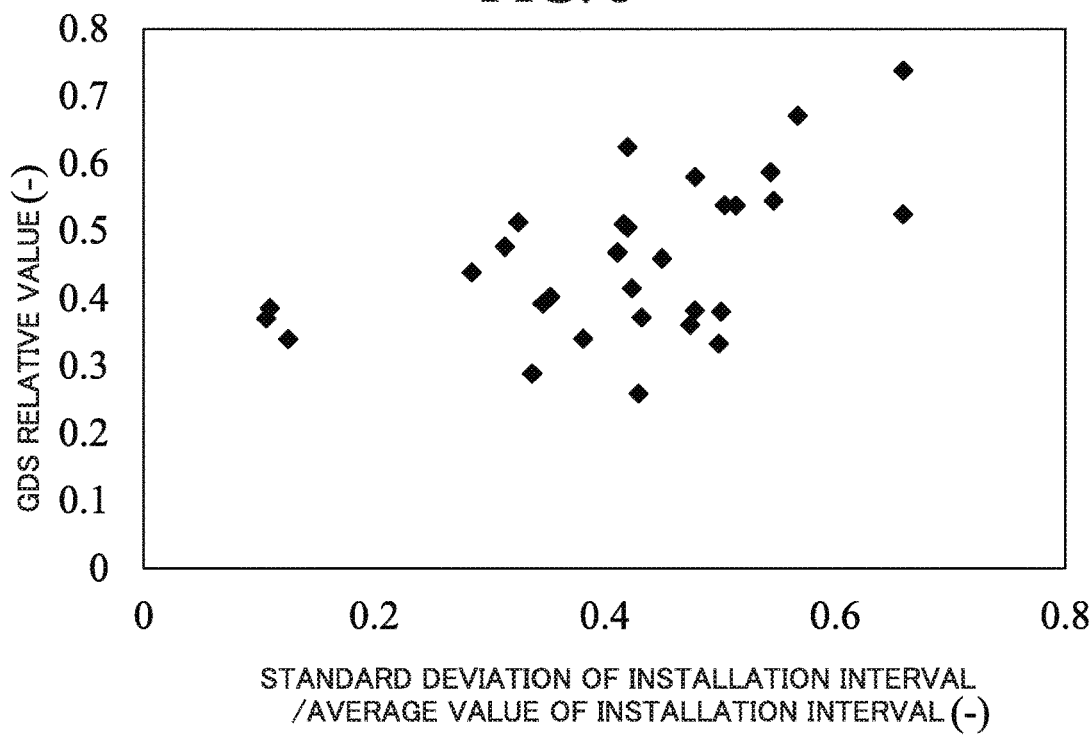
FIG. 5 is a diagram showing a relationship between a variation in installation intervals of mode converters and the GDS reduction effect.

In a case where the total length is kept constant, the number n of converters is set to 30 which is the minimum value, and fluctuation occurs in each installation interval, how much fluctuation can be allowed is obtained in FIG. 5. In this case, the average value of the installation intervals is expressed by Expression (3).

$$(L_t - \Sigma_{i=1}^{n} L_{gi})/(n+1) \tag{3}$$

The horizontal axis is a value obtained by dividing the standard deviation of fluctuation of installation interval by the average value. Although the relative value of GDS is not uniquely determined at a specific standard deviation value, it is found that when the standard deviation/average value is roughly 0.4 or less, the relative value of GDS is 0.5 or less. Therefore, in a case where the transmission line length Lt includes the converter length Lg, an effect of halving the relative value of the GDS can be expected by suppressing the standard deviation of the installation interval to Expression (4) or less.

$$(L_t - \Sigma_{i=1}^{n} L_{gi})/(n+1) \times 0.4 \tag{4}$$

In the case where the mode converter 91 is inserted in the optical fiber transmission line 83 as shown in FIG. 2 and the converter length Lg is not included in the transmission line length Lt, GDS can be reduced by half by suppressing the standard deviation to Expression (5) or less.

$$Lt/(n+1) \times 0.4 \tag{5}$$

An optical fiber having a grating pitch corresponding to the propagation constant difference between the propagation modes in the longitudinal direction may be used for the mode converter 91 described above. Specifically, the present disclosure uses a long period grating (LPG) for the mode converter. The specific structure of the LPG will be described later with reference to FIGS. 11 to 13.

Ideally, in order to convert two modes, it is necessary to use an LPG having a concave-convex interval of $2\pi/\Delta\beta$ corresponding to the propagation constant difference $\Delta\beta$ between the two modes. However, the concave-convex interval of the LPG actually used may deviate from $2\pi/\Delta\beta$ some cases. Therefore, in the present invention, the length corresponding to $2\pi/\Delta\beta$ is defined as the coupling pitch, and the concave-convex interval of the LPG actually installed is defined as the grating pitch. With respect to a higher-order mode with a large propagation constant difference, an LPG with a narrow grating pitch width corresponding to the propagation constant difference is installed.

The refractive index profile of the optical fiber may be selected from a step index type, a graded index type, a multi-step type, a ring type and the like as long as it can propagate a plurality of modes.

Figure 6:
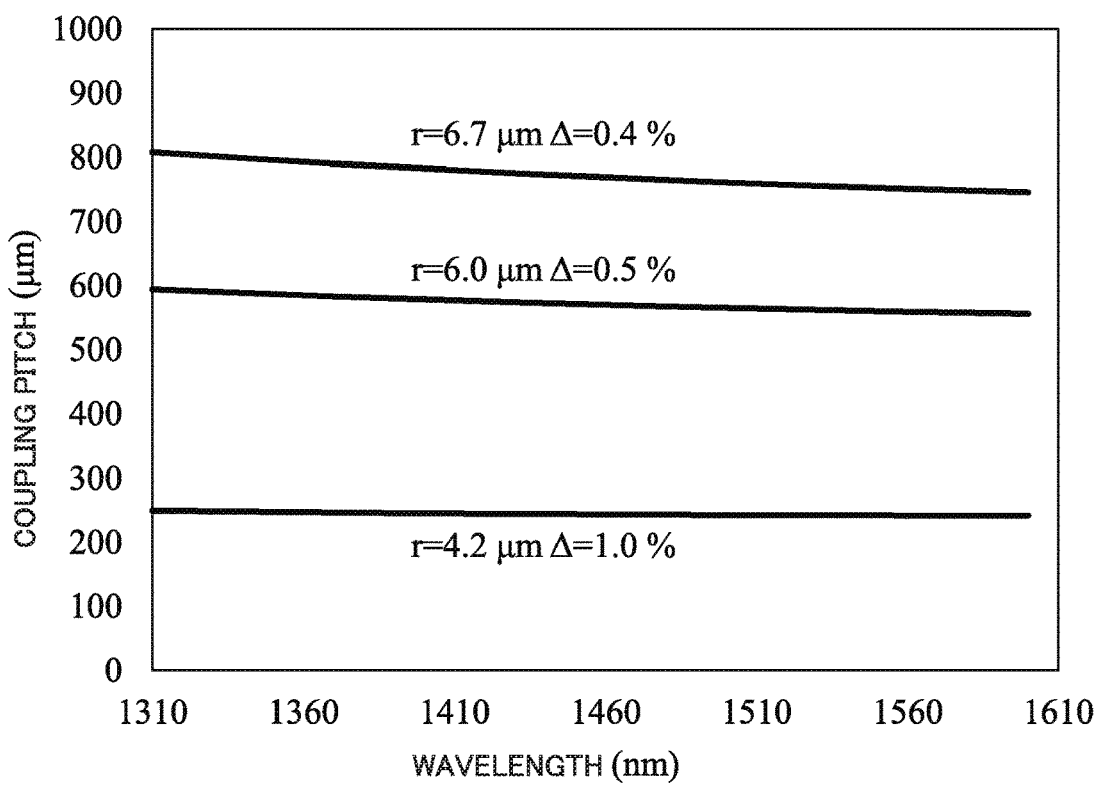
FIG. 6 is a diagram showing a coupling pitch between LP01 and LP11 modes of a two-mode step index fiber.

FIG. 6 shows the coupling pitch obtained from the propagation constant difference between LP01 mode and LP11 mode of a general two-mode step index fiber (core radius r, relative refractive index difference Δ). As described in Non-Patent Document 6, by matching the grating pitch of the LPG with $2\pi/\Delta\beta$ corresponding to the propagation constant difference $\Delta\beta$ between propagation modes of the optical fiber, which is the coupling pitch width, mode coupling between modes can occur.

As described in Non-Patent Document 6, since the number of concavity and convexity of the LPG which is generally used as a mode converter is about 50, the maximum value of concavity and convexity of the LPG is set to 50 here. However, the mode converter 91 in which the number of concavity and convexity in the LPG lasts longer than 50 can also be installed in the optical transmission system according to the present disclosure. In this case, it is assumed that the number n of converters obtained by dividing the number of concavity and convexity by 50 is placed.

Further, a situation where the LPG is pressed over the entire optical fiber transmission line 83 is also included.

Further, by using the LPG for the mode converter 91, it is possible to reduce a mode dependent loss (MDL) and an inter-signal quality difference ΔQ other than GDS.

Figure 7:
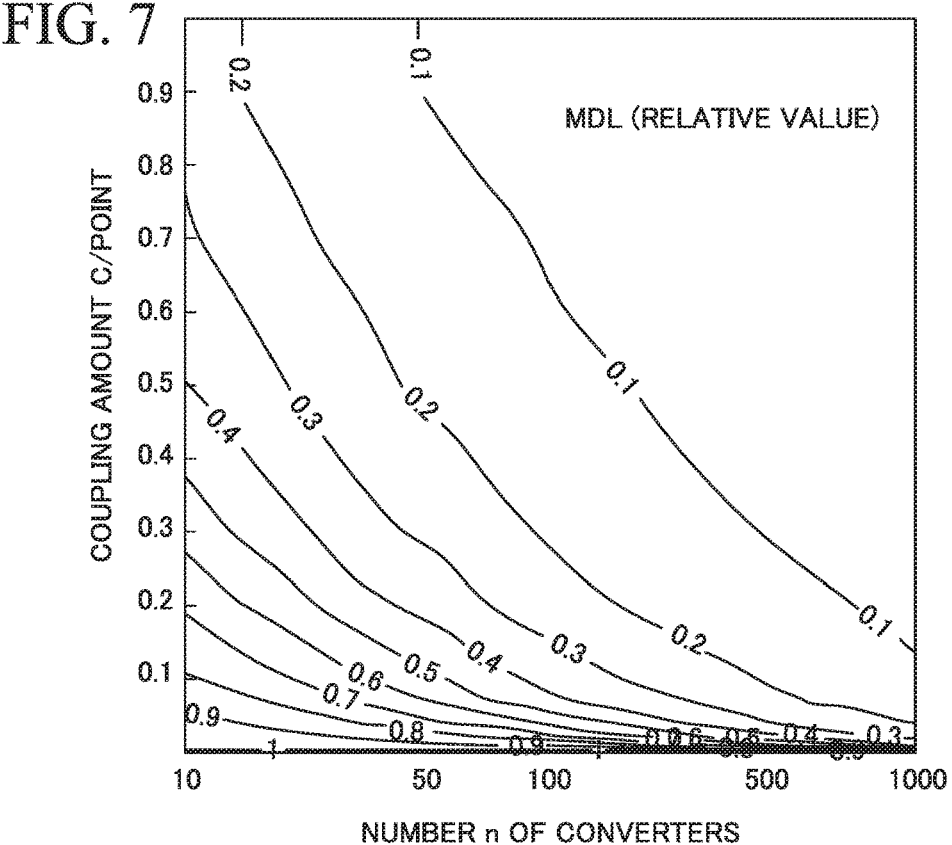
FIG. 7 is a diagram showing the number of converters in the optical fiber transmission line, the coupling amount per point, and an MDL reduction effect at that time.
Figure 8:
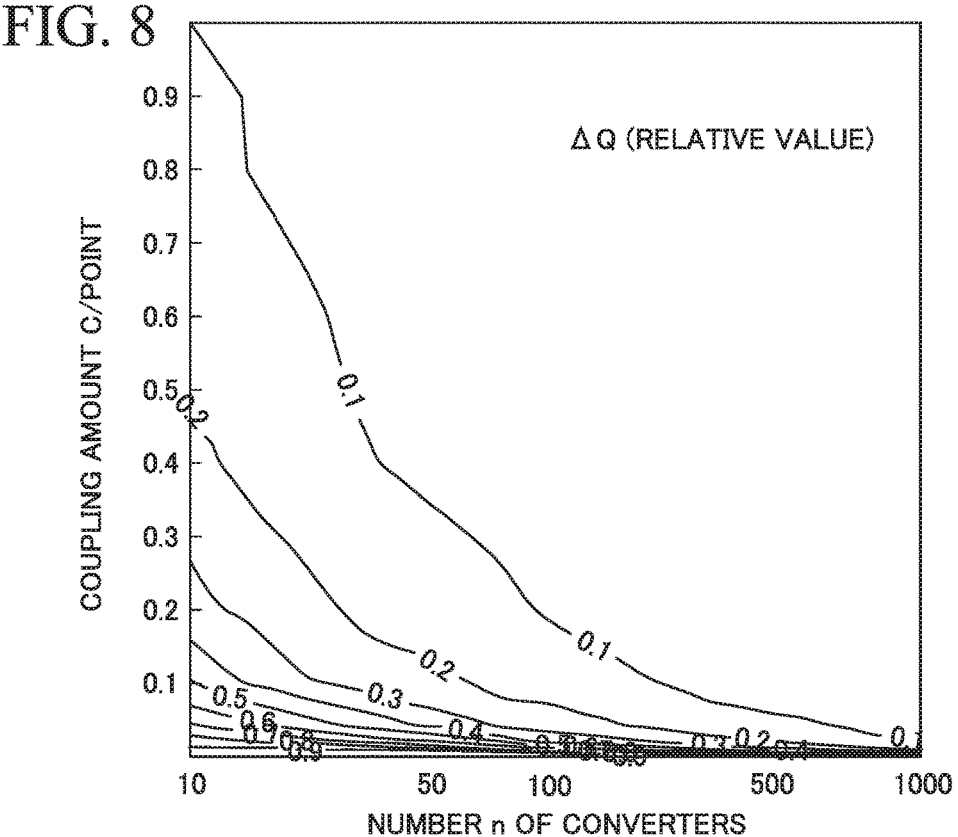
FIG. 8 is a diagram showing the number of converters in the optical fiber transmission line, the coupling amount per point, and a ΔQ reduction effect at that time.

FIG. 7 is a diagram showing the average value of MDL by contour lines, in which the average value of MDL in each number of converters and a coupling amount is calculated as a relative value with respect to a value of MDL in a transmission line without a converter, considering a change in LP11 mode due to disturbance. FIG. 8 is a diagram an average value of ΔQ by contour lines, in which the average value of ΔQ in each number of converters and a coupling amount is calculated as a relative value with respect to a value of ΔQ in a transmission line without a converter, considering a change in LP11 mode due to disturbance.

As shown in FIG. 7, the MDL can be reduced by increasing the number of converters or the coupling amount per point. As shown in FIG. 8, ΔQ can be reduced by increasing the number of converters or the coupling amount per point. Since the tendencies in FIGS. 7 and 8 always have been established regardless of the value of loss in each mode, it is possible to reduce and ΔQ by setting a sufficient number of converters and coupling amounts for any transmission line.

Second Embodiment

In the present embodiment, a preferable example of the number of concavity and convexity and the coupling amount in each concavity and convexity in a case where an LPG is used for the mode converter 91 will be described. For example, for an LPG with 50 concavity and convexity, the necessary coupling amount per one concavity and convexity is shown.

The number of concavity and convexity in an LPG and the electric field amplitudes un and vn after passing through the LPG with respect to the electric field amplitudes u0 and v0 of the input signal are expressed by the relationship of Expression (6) learned from Non-Patent Document 7.

$$\begin{bmatrix} u_n \\ v_n \end{bmatrix} = \begin{bmatrix} \sqrt{1-\kappa^2} & j\kappa \\ j\kappa & \sqrt{1-\kappa^2} \end{bmatrix}^{ncc} \cdot \begin{bmatrix} u_0 \\ v_0 \end{bmatrix} \quad (6)$$

However, κ is the coupling amount per one concavity and convexity (0<κ<1), and the number of concavity and convexity (ncc) is the number of concavity and convexity.

Figure 9:
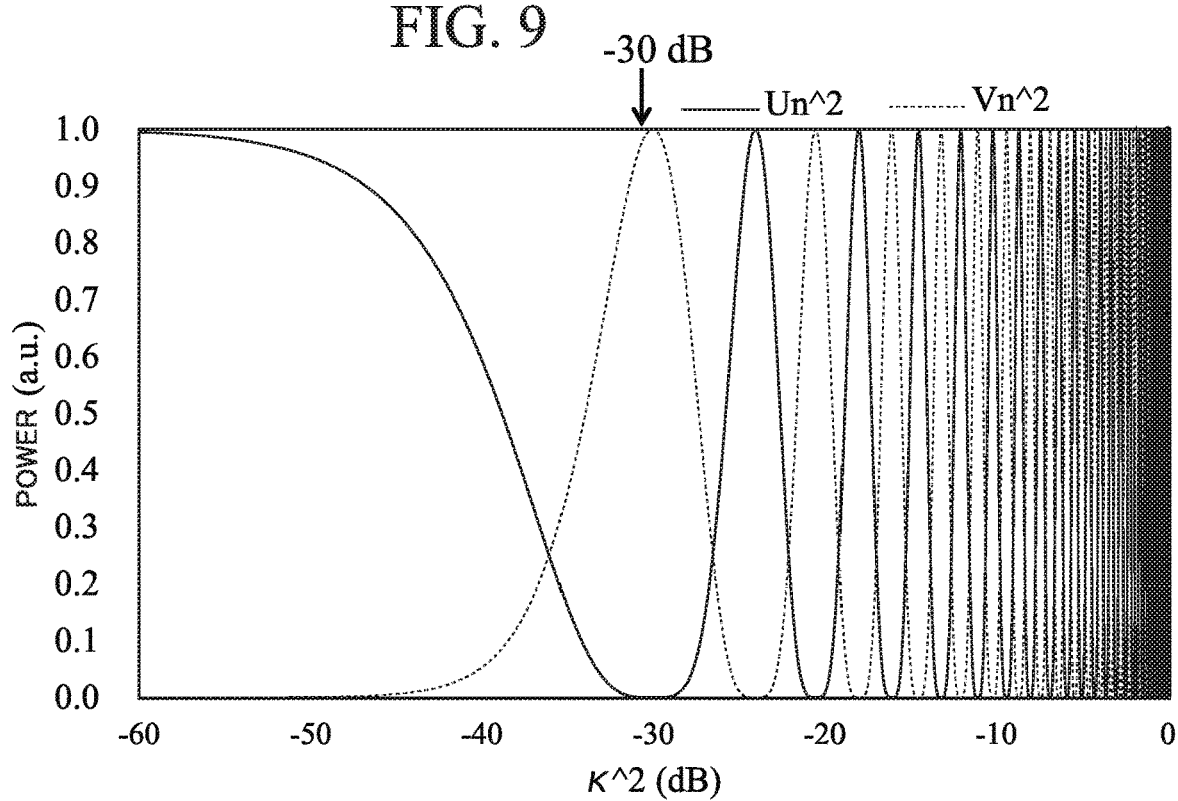
FIG. 9 is a diagram showing the power fluctuation of the propagation mode with respect to the coupling amount per concavity and convexity of the grating in the LPG having 50 concavity and convexity.

The calculation result of un and vn with respect to the value of κ is shown in FIG. 9, with n set to 50. Here, the horizontal axis in FIG. 9 represents κ2 which is a value obtained by converting K into a dimension of power, and the vertical axis represents u2 and v2 obtained by converting un and vn into a dimension of power. When u0=1, v0=0 at first, in a case where coupling occurs and κ increases, the power of u0 starts to move to v0. When κ is −30 dB, the power of un completely shifts to vn and becomes 1. As the value of κ is increased above −30 dB, more power interaction occurs, and coupling occurs frequently. At this time, the coupling amount per concavity and convexity necessary to obtain the maximum coupling amount is about −30 dB. When the number of concavity and convexity is 50, regardless of the coupling pitch, the coupling amount per one concavity and convexity may be about −30 dB, and if the number of concavity and convexity is decreased, the necessary coupling amount per one concavity and convexity is increased.

Figure 10:
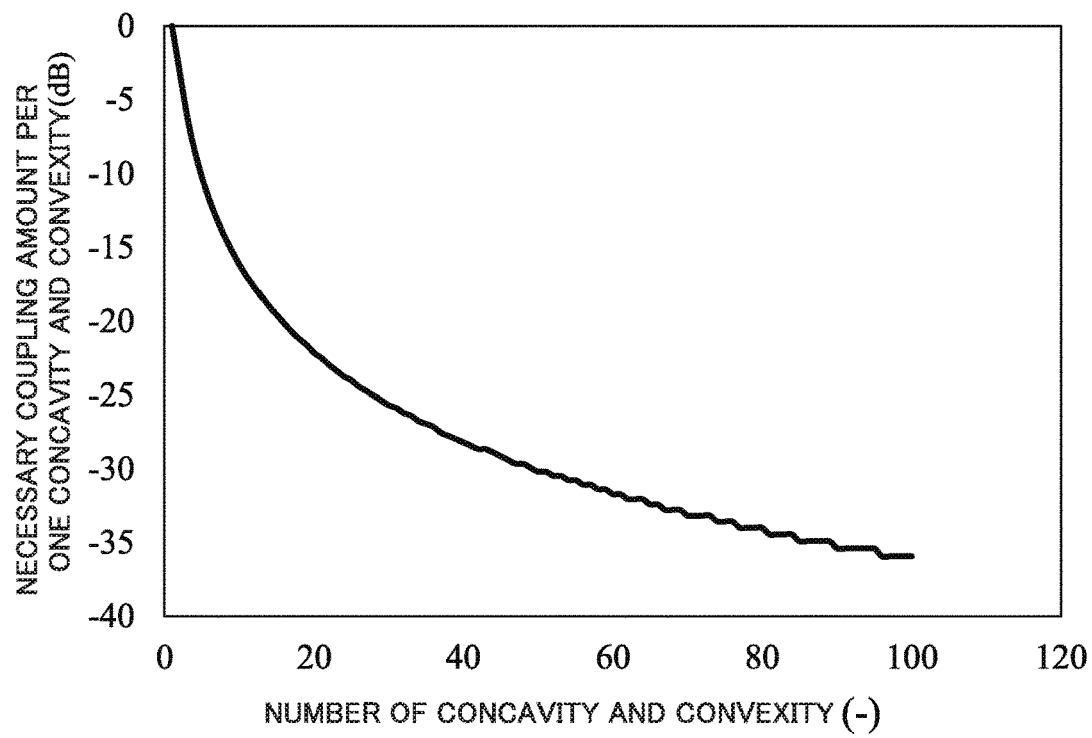
FIG. 10 is a diagram showing a calculation result of necessary coupling amount per concavity and convexity with respect to the number of concavity and convexity of LPG.

As shown in FIG. 10, by changing the pressing force according to the number of concavity and convexity, it is possible to obtain a high conversion efficiency by LPGs having various numbers of concavities and convexities.

Third Embodiment

For the optical fiber transmission line 83 in the third embodiment, a low GDS fiber, a ring core fiber which is likely to be coupled, a tension imparting fiber, a GDS compensation transmission line, and the like can be used in combination with each other. In this case, it is possible to expect an effect of reducing propagation time difference between the modes by pressing the LPG, and it is possible to provide an optical transmission system that can transmit with very low signal processing load.

Even in the optical fiber transmission line 83 in the present embodiment, it is preferable to use an LPG for the mode converter 91, and apply the number of concavity and convexity and the coupling amount in each concavity and convexity described in the second embodiment.

Fourth Embodiment

In the above-described embodiments, in a case where LPG is used for the mode converter 91, the concavity and convexity of the LPG pressed against the optical fiber may have any shape such as a rectangle, a trapezoid, a triangle, a sine wave shape, an arc shape, or the like. If the concavity and convexity of the LPG is periodic, the functions and effects explained in the first and second embodiments can be obtained.

Fifth Embodiment

In the above-described embodiments, an example in which the mode converter 91 is a long period grating is shown, but the mode coupling in the mode converter 91 is not limited to a pressing-type grating. For example, a refractive index change may be given to an optical fiber by using a CO2 laser, a UV laser or the like, or periodic bending may be applied to an optical fiber.

Figure 11:
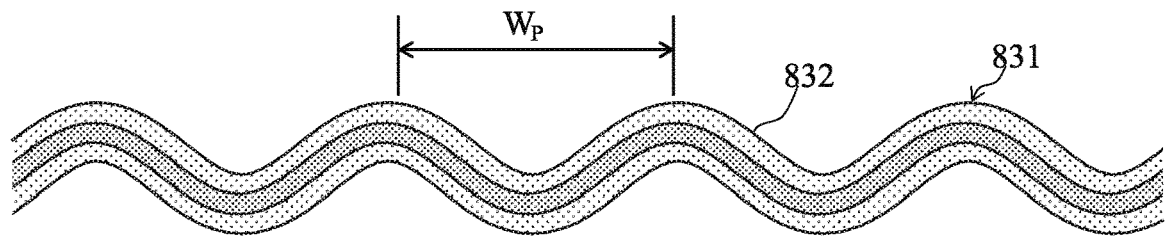
FIG. 11 is a diagram showing a state where periodic bending is applied to an optical fiber.
Figure 12A:
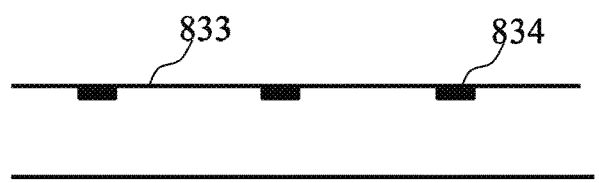
FIG. 12A is a diagram showing a state where periodic bending is applied to the core of the optical fiber by applying a stress to n optical fiber having concavity and convexity on a coating.
Figure 12B:
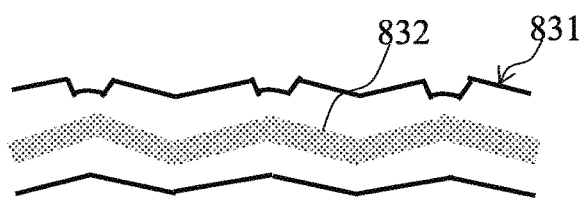
FIG. 12B is a diagram showing a state where periodic bending is applied to the core of the optical fiber by applying a stress to an optical fiber having concavity and convexity on a coating.
Figure 13:
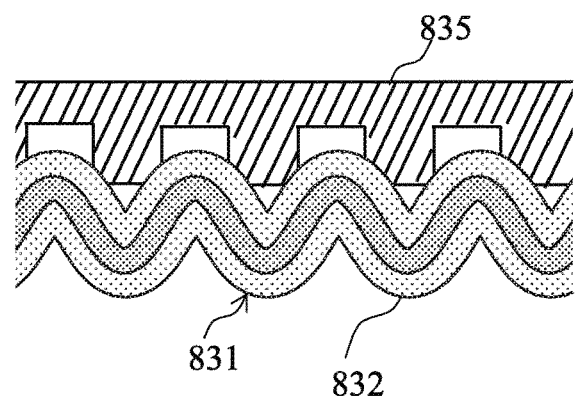
FIG. 13 is a diagram showing a state where periodic bending is applied to the core of the optical fiber by pressing a grating plate against an optical fiber.

The bending may be applied to the optical fiber in any method. For example, FIG. 11 shows that bending may be applied to the optical fiber 831 itself, and the core 832 may be bent with a grating pitch WP. In addition, as shown in FIG. 12B, when stress is applied to the coating 833 of the optical fiber after providing the concavity and convexity 834 as shown in FIG. 12A, an optical fiber in which the core 832 is bent can be exemplified. Further, FIG. 13 shows an optical fiber to which bending is applied by pressing the grating plate 835 against the optical fiber 831.

Sixth Embodiment

There is a method of reducing the GDS by, for example, coupling between modes with the largest GDS of the optical fiber in order to reduce the GDS, when the number of propagation modes of the optical fiber transmission line 83 is set to N. In order to obtain a larger GDS reduction effect by coupling other modes, a grating with a plurality of grating pitches is required as necessary. Further, a higher GDS reduction effect can be expected by similarly applying a grating with a plurality of grating pitches even in the case of multiplexing and transmitting wavelengths.

Figure 14:
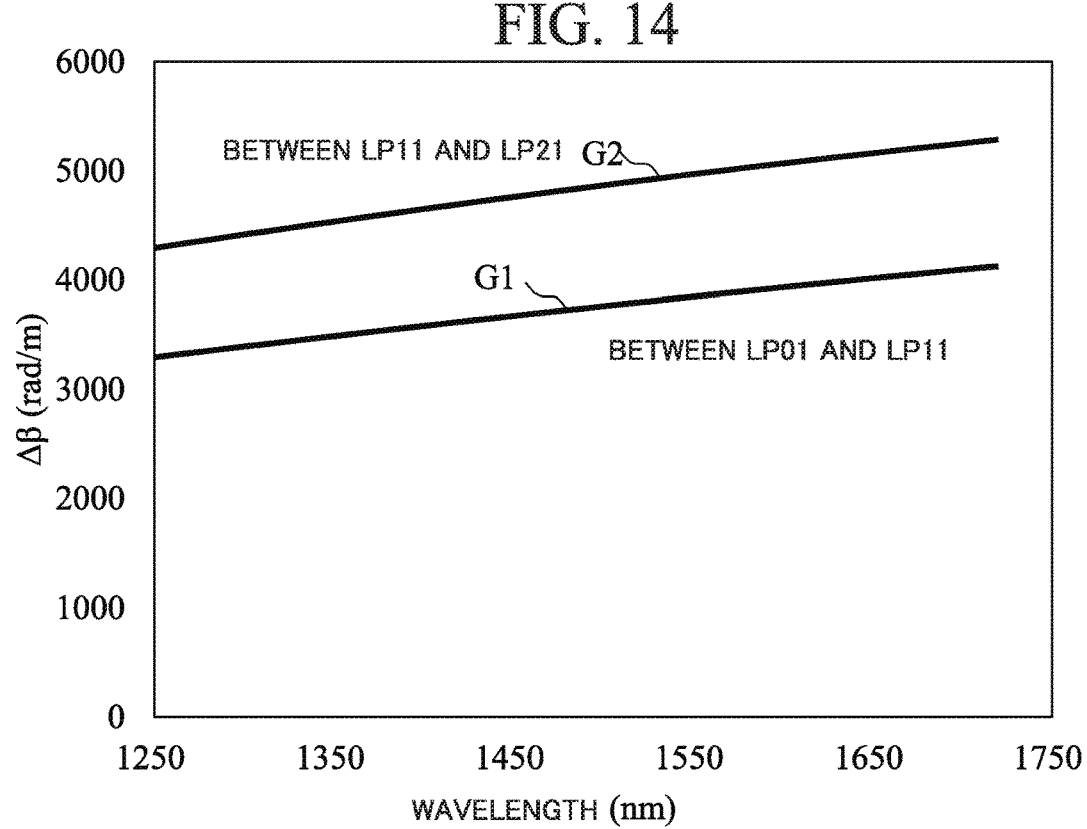
FIG. 14 is a diagram showing the wavelength dependence of the propagation constant difference between LP01 and LP11 modes of the optical fiber and the propagation constant difference between LP11 and LP21 modes.
Figure 15:
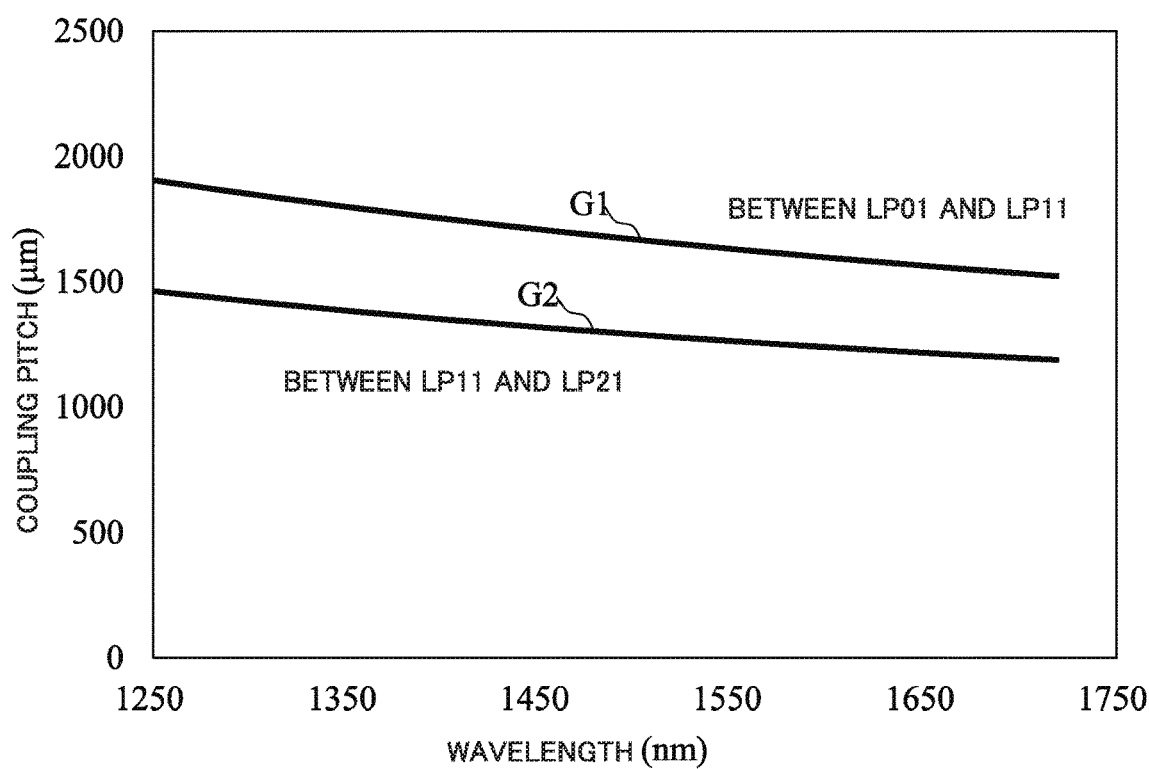
FIG. 15 is a diagram showing the wavelength dependence of the coupling pitch between the LP01 and LP11 modes of the optical fiber and the coupling pitch between the LP11 and LP21 modes.

FIG. 14 and FIG. 15 show examples of the wavelength dependence of the propagation constant difference Δβ and the coupling pitch WP, respectively. In FIG. 14 and FIG. 15, G1 corresponds to the case between LP01 and LP11 modes, and G2 corresponds to the case between LP11 and LP21 modes. For example, in the case of a step index fiber with a core radius of 12 μm and Δ0.4%, as shown in FIG. 14, the propagation constant difference Δβ between LP01 and LP11 modes is different from Δβ between LP11 and LP21 modes, and both has the wavelength dependence. Therefore, 2π/Δβ, which is the coupling pitch of the LPG in which mode coupling occurs, also differs depending on the mode set as shown in FIG. 15. Therefore, it is preferable to apply a grating corresponding to the mode and wavelength to be transmitted to the optical fiber transmission line 83.

FIG. 16 shows an example of a step index fiber having a core radius of 12 μm and Δ0.4%, For example, in a case of generating only mode coupling between LP01 and LP11 modes, a grating pitch may be in the range of 30 μm of 1620 to 1650 μm in the case of C band. In addition, it is necessary to provide a grating pitch in the range of 1580 to 1650 μm to cover the C to L bands and 1580 to 1900 μm to cover the O to L bands. Furthermore, in order to generate mode coupling between LP11 and LP21 modes, it is necessary to provide a fine grating pitch shown in FIG. 16.

Seventh Embodiment

The period of the LPG applied to the optical fiber transmission line 83 does not necessarily have to be a length corresponding to 2π/Δβ using the propagation constant difference Δβ between modes propagating through the optical fiber and the coupling condition is eased a little. In general, the strength φ of mode coupling is expressed by Expression (7).

$$\phi = \frac{L}{4}\left\{\frac{\sin\left[\frac{(\beta_l - \beta_m - \Omega)L}{2}\right]}{\frac{(\beta_l - \beta_m - \Omega)L}{2}}\right\}^2 \quad (7)$$

Figure 17:
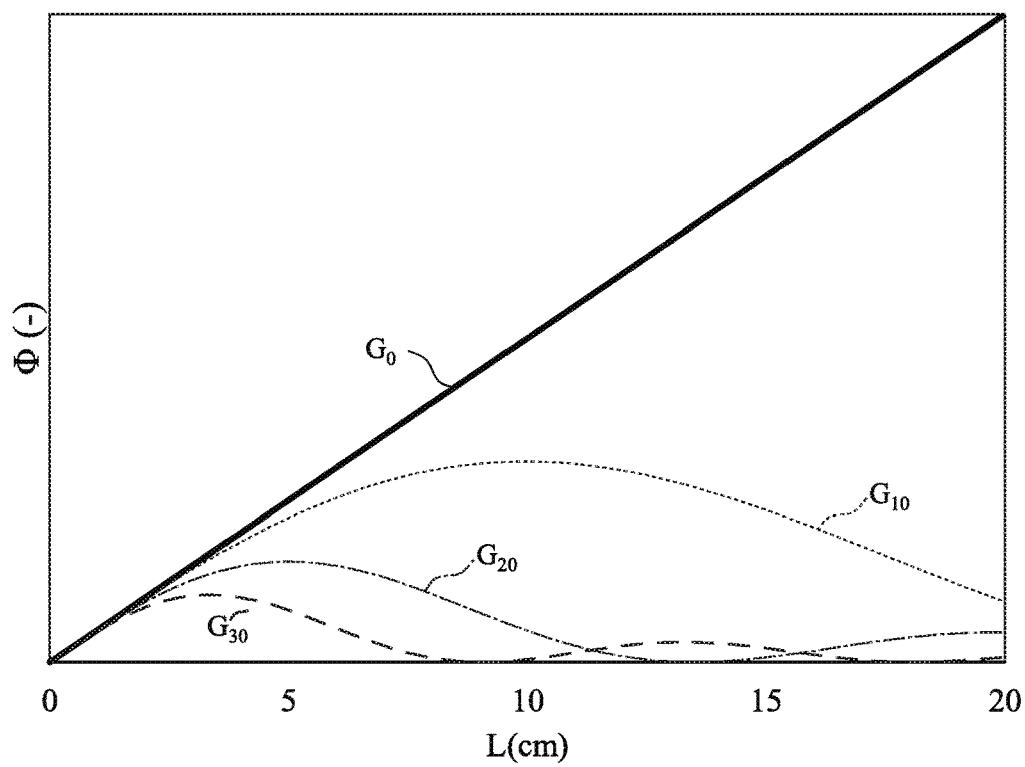
FIG. 17 is a diagram showing the relationship between the grating pitch deviation of the mode coupling strength $\varphi$ with respect to the structural change length L of the optical fiber.

However, in a case where the propagation constant differences of model and mode m are β1 and βm and the grating pitch of the ideal structural change is 2π(β1−βm) which is the coupling pitch, the period of the structural change given to the optical fiber is 2π/Ω and the total length of the structural change is L. In the step index fiber having a core radius of 12 μm and Δ0.4%, in a case where β in the LP01 mode at the wavelength of 1550 nm is β1 and βm the LP11 mode is βm, the strength φ of coupling between the LP01 mode and the LP11 mode is represented as shown in FIG. 17. The plots G0, G10, G20, and G30 shown FIG. 17 represent φ when Δpitch expressed by the following expression is 0 μm, 10 μm, 20 μm, and 30 μm, respectively.

The deviation Δpitch of the grating pitch is expressed by Expression (8) by using the structure period of the LPG actually applied and the coupling pitch corresponding to Δβ between the LP01 and LP11 modes.

$$\Delta_{pitch} = \left|\frac{2\pi}{\Omega} - \frac{2\pi}{(\beta_l - \beta_m)}\right| \quad (8)$$

In the plot G0 when Δpitch is 0, the coupling pitch corresponding to Δβ between propagation modes and the period of the LPG applied to the optical fiber match, so the longer the LPG length L, the stronger the strength φ of mode coupling. Although an ideal grating pitch is 1633 μm, when a deviation of 10 μm is given to the grating pitch, as shown in plot G10, φ when the LPG length is short can be approximated to a plot G0 with Δpitch=0, but as the LPG length becomes longer, the value of φ decreases, the plot G20 with a deviation of 20 μm and the plot G30 with a deviation of 30 μm can be approximated only when L is small. From this, it is understood that the shorter the length L, the more ideal φ is obtained with respect to the grating pitch deviation, and the larger the grating pitch deviation is, the shorter the L is required. The range in which these curves can be regarded as approximately equal to the plot with Δpitch=0 is expressed by Expression (9).

$$|(\beta_l - \beta_m) - \Omega| \ll \frac{\pi}{L} \quad (9)$$

Figure 18:
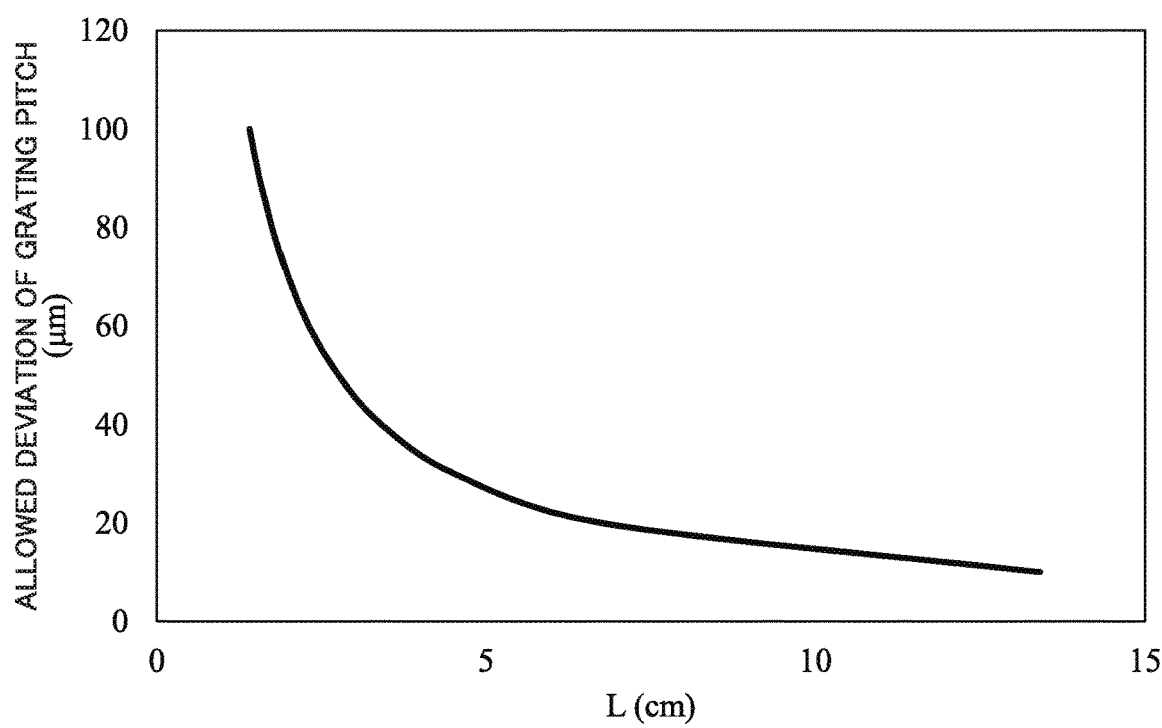
FIG. 18 is a diagram showing the relationship between the maximum deviation amount of grating pitch which can be approximated when ideal mode coupling strength $\varphi$ is obtained with respect to the structural change length L of the optical fiber.

FIG. 18 shows the result of obtaining the LPG length L and the allowable deviation amount of the grating pitch from the relational expression. The shorter the length L, the larger the allowable deviation amount. From this, when L is short, it is possible to generate mode coupling in a wide range of wavelength band even if the grating pitch of the LPG is constant. For example, since the allowable deviation is 100 μm at a structural change length of 1.41 cm, it can be said that mode coupling occurs when the desired coupling pitch is within ±100 μm.

As shown in FIG. 16, although the band to be converted is different depending on the wavelength, by determining the coupling change length L covering the band, it is possible to cover a wide hand with a small grating pitch type.

Eighth Embodiment

When a graded index (GI) fiber is used as the optical fiber transmission line 83, it is possible to generate inter-mode coupling of a plurality of modes with one type of grating pitch. As shown in FIG. 19, the GI fiber is characterized in that the propagation constant difference Δβ between the mode groups is equal. Since the effective refractive index difference between the mode groups is different, the mode coupling between a plurality of modes can be generated more easily compared with a step index fiber requiring gratings having corresponding grating pitches. Although preferred embodiments of the present invention have been described above, the present invention is not limited to these embodiments and modification examples thereof. Additions, omissions, substitutions, and other changes in the structure are possible without departing from the spirit of the present invention. The present invention is not limited by the foregoing description, and is only by the scope of the appended claims.

INDUSTRIAL APPLICABILITY

According to the present disclosure, it is possible to realize optical fiber transmission of a large capacity and long distance by utilizing a higher-order mode of the fiber.

REFERENCE SIGNS LIST

81: TRANSMITTER
82: FIR EQUALIZER
83: OPTICAL FIBER TRANSMISSION

831: OPTICAL FIBER
832: CORE
833: OPTICAL FIBER COATING
834: CONCAVITY AND CONVEXITY
835: GRATING PLATE
84: MODE MULTIPLEXER
85: MODE DEMULTIPLEXER
91: MODE CONVERTER

What is claimed is:

1. An optical transmission system comprising:
an optical fiber transmission line that includes an optical fiber with two or more propagation modes; and
a plurality of mode converters that are configured to generate mode coupling between at least one pair of the propagation modes,
wherein a variation in installation intervals of the plurality of mode converters is equal to or less than a threshold value determined by a transmission line length of the optical fiber transmission line,
wherein a transmission line length of the optical fiber transmission line is Lt, a converter length of the mode converter is Lg, and the number of the mode converters are n,
wherein in a case where the transmission line length Lt includes the converter length Lg, standard deviation of an installation interval of the mode converter is equal to or less than a value expressed by a following expression (C1), and
wherein a relative value of a group delay spread of the optical fiber transmission line in where the mode converter is provided relative to a group delay spread of the optical fiber transmission line itself in where the mode converter is not provided is equal to or less than 0.5, $$(L_t - \Sigma_{i=1}^{n} L_{gi})/(n+1) \times 0.4. \quad (C1)$$

2. An optical transmission system comprising:
an optical fiber transmission line that includes an optical fiber with two or more propagation modes; and
a plurality of mode converters that are configured to generate mode coupling between at least one pair of the propagation modes,
wherein a transmission line length of the optical fiber transmission line is Lt, a converter length of the mode converter is Lg, and the numbers of the mode converters are n,
wherein in a case where the transmission line length Lt does not include the converter length Lg, standard deviation of an installation interval of the mode converter is equal to or less than a value expressed by a following expression (C2), and
wherein a relative value of a group delay spread of the optical fiber transmission line in where the mode converter is provided relative to a group delay spread of the optical fiber transmission line itself in where the mode converter is not provided is equal to or less than 0.5, $$Lt/(n+1) \times 0.4. \quad (C2)$$

3. An optical transmission system comprising:
an optical fiber transmission line that includes an optical fiber with two or more propagation modes; and
a plurality of mode converters that are configured to generate mode coupling between at least one pair of the propagation modes,
wherein a variation in installation intervals of the plurality of mode converters is equal to or less than a threshold value determined by a transmission line length of the optical fiber transmission line, and
wherein a sum of the coupling amount of mode coupling of the plurality of mode converters is larger than a threshold value determined by a group delay difference between the propagation modes of the optical fiber transmission line.

4. The optical transmission system according to claim 1, wherein an optical fiber having a grating pitch corresponding to a propagation constant difference between the propagation modes in a longitudinal direction is used for the mode converter.

5. The optical transmission system according to claim 2, wherein an optical fiber having a grating pitch corresponding to a propagation constant difference between the propagation modes in a longitudinal direction is used for the mode converter.

6. The optical transmission system according to claim 3, wherein an optical fiber having a grating pitch corresponding to a propagation constant difference between the propagation modes in a longitudinal direction is used for the mode converter.

7. The optical transmission system according to claim 1, the numbers of the mode converters are equal to or more than 30.

8. The optical transmission system according to claim 2, the numbers of the mode converters are equal to or more than 30.

9. The optical transmission system according to claim 3, the numbers of the mode converters are equal to or more than 30.

* * * * *